United States Patent [19]

Lopez

[11] 4,372,092

[45] * Feb. 8, 1983

[54] PRECAST CONCRETE MODULAR BUILDING PANEL

[76] Inventor: Fred T. Lopez, 1772 22nd St., Ogden, Utah 84401

[*] Notice: The portion of the term of this patent subsequent to Apr. 7, 1998, has been disclaimed.

[21] Appl. No.: 216,858

[22] Filed: Dec. 16, 1980

Related U.S. Application Data

[63] Continuation of Ser. No. 714,919, Aug. 16, 1976, Pat. No. 4,259,824.

[51] Int. Cl.³ .............................................. E04B 5/04
[52] U.S. Cl. ...................................... 52/612; 52/659; 106/99; 106/103
[58] Field of Search ................................ 52/612, 659; 106/DIG. 2, 99, 103, 97, 98

[56] References Cited

U.S. PATENT DOCUMENTS

| | | | |
|---|---|---|---|
| 205,616 | 6/1878 | Cummings | 106/99 |
| 889,569 | 9/1907 | Albrecht | 106/99 |
| 935,616 | 9/1909 | Todd | 106/99 |
| 1,961,525 | 6/1934 | Offutt | 106/99 |
| 2,008,718 | 7/1935 | Jenkins | 52/612 |
| 2,021,956 | 11/1935 | Gladney | 52/612 |
| 2,421,721 | 6/1947 | Smith | 52/612 |
| 2,446,990 | 8/1948 | Schuetz | 106/99 |
| 2,509,599 | 5/1950 | Hollenberg | 106/99 |
| 3,051,590 | 8/1962 | Proux | 106/99 |
| 3,615,783 | 10/1971 | Howard | 106/103 |
| 3,834,916 | 9/1974 | Kesler | 106/99 |
| 3,847,633 | 11/1974 | Race | 106/99 |
| 3,982,954 | 9/1976 | Jeskey | 106/97 |
| 4,259,824 | 4/1981 | Lopez | 106/99 |

OTHER PUBLICATIONS

*Pumice and Scoria;* . . . by Perlaki Acta Geologica, vol. 10, No. 1-2, pp. 13-29, file 89 Geovet.

*Primary Examiner*—John E. Murtagh
*Assistant Examiner*—Henry E. Raduazo
*Attorney, Agent, or Firm*—A. Ray Osburn

[57] ABSTRACT

A precast modular panel suitable for forming at least a portion of a wall or other part of a building, and associated methods of constructing said panel, the panel comprising lightweight, high strength, water resistant concrete achieved by a unique combination of lightweight aggregates and structural additives, said concrete therefore exhibiting high structural strength and high insulative properties. In accordance with one aspect of the disclosure, the panel comprises a layer of lightweight high strength concrete possessing high insulative properties combined with a layer of lightweight concrete particularly selected to enhance the composite insulative properties of the panel. The panel may be constructed with a minimum of labor and with maximum utilization of available forms and the like and may carry provisions for its ready connection with other similar panels, and with other building structures. The panel comprises also electrical outlets and passages therethrough, so that such passages need not be installed in the building walls after construction.

The lightweight aggregates comprise scoria to impart strength to the concrete, in cooperation with especially selected pumice to provide water resistance and high insulative properties, along with chopped fiberglass to enhance the structural strength, so that the lightweight concrete possesses strengths fully comparable to those of many concretes for structural uses. The insulative properties of the lightweight concrete contract very favorable to those of other lightweight concretes, and with conventional structural concrete. The panel may be so constructed as to require no subsequent decorative finishing.

5 Claims, 11 Drawing Figures

PRECAST CONCRETE MODULAR BUILDING PANEL

RELATED APPLICATIONS

This application is a continuing Application of co-pending application: Ser. No. 714,919; filed Aug. 16, 1976, now U.S. Pat. No. 4,259,824; Inventor, Fred Tellez Lopez; and having also the title hereinbelow.

BACKGROUND OF THE INVENTION

1. Field of Invention

Broadly, the present invention relates to the use of concrete as a material for constructing buildings, and more particularly to construction of buildings using precast panels of concrete. With still more particularity, the invention relates to the use of modular panels to make up at least a portion of the walls of buildings, the panels being precast of concrete comprising lightweight aggregates and strength enhancers.

2. Prior Art

Heretofore, precast panels for the construction of buildings, particularly for the walls thereof, have utilized structural concrete to attain the structural strength required to withstand handling loads and loads imposed by the building structure. However, the use of structural concrete, which normally comprises heavy aggregates such as gravel and the like, has caused the panels to be excessively heavy, so that handling the installation has been both expensive and laborious, also requiring unnecessarily expensive heavy handling equipment. Further, such panels have required much finishing work after installation into the building to provide the aesthetic effects often desired. Such panels have, additionally, been difficult to work with, since fastening building objects thereto requires the use of rock drills and the like. Further, they have often required the addition of insulating materials thereto. The resulting final building walls have accordingly been composite structures wherein the panels has comprised only one part, so that the total expense of such panels has seriously compromised the potential economic advantages inherent to mass produced panels.

In attempts to overcome the aforesaid disadvantages of the use of structural concrete for panels, much work has been done with lightweight aggregates in the concrete for use in panels. However, concrete made from these lightweight aggregates, which include vermiculite, perlite, scoria, pumice, expanded shale, cinders and others, have in most instances possessed less than desirable structural strength, or have even been excessively low in structural strength. Concretes comprising vermiculite and perlite in particular have largely been limited to strength below 1000 pounds per square inch so that their uses have largely been as insulating fillers, with other structural components being provided to carry the imposed loads. Concretes comprising pumice or scoria exhibit somewhat higher structural strengths, while being somewhat more dense. However, the strength of the pumice and scoria concretes have been largely limited to 1000 to 3000 p.s.i., still less than desirable for many structural uses.

Another problem with the use of lightweight aggregates comprising concrete for precast building panels is the tendency of such concretes to be pervious to water, so that exposed panels tend to be damaged by weather excessively fast. Thus, although a concrete comprising scoria, for example, as the principal aggregate may, marginally, possess sufficiently structural strength, such concrete is normally unacceptably susceptibile to moisture and water.

While expanded shale, clay, or slate can be used as a lightweight aggregate to produce acceptable structural strength while remaining sufficiently impervious to water, such concretes are comparatively expensive to construct, since these aggregates require extended drying in kilns and the like, or sintering, and careful handling of the aggregate, generally with specialized equipment, to achieve the requisite strengths.

Still another important consideration for modular panels making up the walls of buildings has been their insulating properties. Resistance to heat flow through the panels should be at a high level to minimize the cost of subsequent heating and cooling the resulting structure. Generally, the concretes exhibiting high strength have been less than desirable as insulating structures. Structural concrete, for instance, is not in itself an effective insulator for the wall of a building. Generally, even the above mentioned more expensive lightweight concretes fall short of desired insulating properties. Accordingly, insulating layers of other materials have of necessity been added to the panels used in the construction of buildings. These have often comprised cellular plastic materials, or even cork, wood and the like, and have contributed additional material and installation expense. Attempts have also been made to construct panels comprising layers of concrete for strength and layers for high insulative properties, the layers being cast one upon the other. However, these panels have often been unsatisfactory because the layers tend strongly to separate, before or after installation into a building, so that such panels often cannot be so used.

BRIEF SUMMARY AND OBJECTS OF THE INVENTION

The present invention eliminates or substantially alleviates the aforesaid disadvantages of the prior art by providing lightweight concretes, panels constructed thereof, and associated methods. The concretes are light in weight, have entirely adequate structural strength for use in modular panels for building construction, and have a high degree of insulation to obviate the necessity of adding insulating layers. The lightweight concretes of the present invention further exhibit entirely adequate resistance to moisture and water and are highly fire resistant.

The modular panels in accordance with the present invention may be constructed by simple mass production techniques and may be installed with a minimum of equipment and labor, requiring little or no finishing work after installation into the walls or other parts of a building, since surfaces of selectable textured appearance are achieved during the casting of the panels. The inventive lightweight concrete comprises lightweight aggregates and structural additives which cooperate in the concrete to produce a highly useful combination of high insulating properties in a panel which can be constructed economically by mass production methods.

With the foregoing in mind, it is a primary object of the present invention to provide a precast modular panel suitable for forming a portion of a wall or other suitable part of a building, said panel being light in weight, high in strength, highly resistant to water, and highly resistant to the flow of thermal energy therethrough.

Another paramount object of the invention is to provide a lightweight concrete having unusually low density and high structural strength in a water resistant concrete.

A still further paramount object of the invention is to provide a method of producing panels entirely satisfactory for use in the construction of building walls thereof, said method being economical, and requiring minimum amounts of labor and time.

Another paramount object of the invention is to provide differently comprised concretes selectively of high strength and of high insulative performance which may be cast in layers, one upon the other without separating one from the other after their cure together to form a panel or other object.

A still further object of the invention is to provide a lightweight concrete comprising lightweight aggregates conforming with Federal standards for lightweight aggregates for use in housing construction.

A still further object of the invention is to produce a precast modular panel having surface finishes such that further finishing for decorative purposes is not required.

Another object of the invention is to provide a precast modular building panel requiring no addition of insulative material.

Still another object of the invention is to provide a precast concrete modular wall panel wherein electrical conduits and cooperating electrical outlet boxes are provided in the panels so as to communicate with similar boxes and conduits in adjacent panels and with the upper edges of the panels so that no electrical channels need be installed in the building walls after the building is constructed of the panels.

A still other object of the invention is to provide a precast modular panel carrying provisions for attachment to similar panels and to the foundation, window frames, door frames and the like of the building.

A still further object of the invention is to provide a precast modular panel construction method whereby available molds and forms are utilized to the optimum degree.

A still further object of the invention is to provide a precast modular panel construction method whereby a single large mix of lightweight concrete may be used in the construction of a plurality of such panels.

Still further objects and advantages of the present invention will be apparent from the detailed description of the illustrated embodiments of the invention, made with reference to the accompanying drawings.

DETAILED DESCRIPTION OF THE ILLUSTRATED EMBODIMENT

Figure 1:
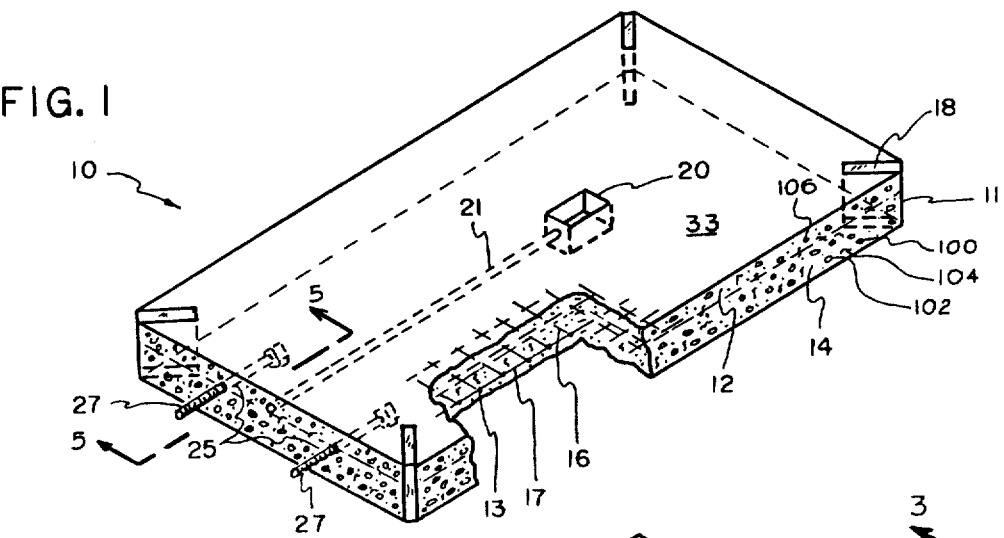
FIG. 1 is a perspective, partially broken, representation of a modular building panel in accordance with the principles of the invention.

Reference is made now to the drawings, wherein like numerals are used to designate like parts throughout. FIG. 1 in particular illustrates a presently preferred embodiment of the present invention, generally designated 10, comprising a lightweight precast concrete modular panel especially suitable for forming a part of a building when serially connected with other similar panels. The illustrated panel 10 is generally rectangular in shape. However, panels of any desired shape could be used, some of which could be configured to form openings for windows, doors and the like, so that substantially all of the walls of a dwelling or other suitable building could be formed by serial connection of the panels.

The panel 10 comprises a first layer 12 of lightweight concrete and a second layer 14 of a second lightweight concrete. The layers 12 and 14 each comprise concrete made from mixes comprising aggregate selected to impart particular desirable characteristics to the panel 10, said characteristics varying between layers 12 and 14, as will be hereinafter more fully described. For example, the layer 12 may be formulated to impart structural strength to the panel 10, while the layer 14 may be formulated to impart a high degree of thermal insulation to the panel.

Figure 7:
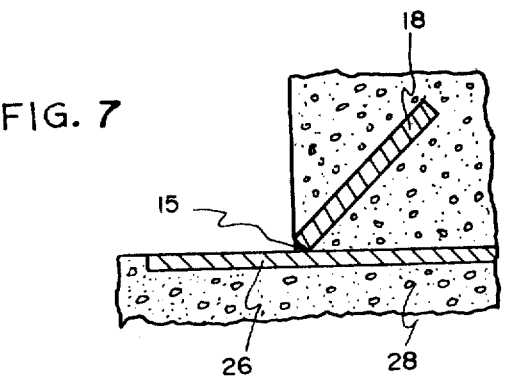
FIG. 7 is an enlarged partial representation of the panel of FIG. 1 showing a corner thereof welded to a mounting plate carried by a building foundation.

As hereinafter fully described, the concrete comprising the structurally strong layer 12 comprises aggregates selected for their ability to vest the concrete of layer 12 with high strength, high water resistance, low thermal conductivity, and light weight. The aggregates comprise scoria 100, pumice 102 of a particular nature hereinafter described, and chopped fiberglass 104 or other suitable fibrous material. (See FIG. 7) Both layers 12 and 14 preferrably comprise such fibrous material, which helps to achieve a structurally sound interface between the layers 12 and 14, as will be described in greater detail hereinafter.

Figure 5:
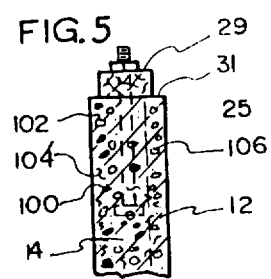
FIG. 5 is a partial cross-sectional representation taken along line 5—5 of FIG. 1, a wooden base plate being added thereto to illustrate the use of the anchor bolts of the panel.

Referring again to FIG. 1, the panel 10 may also comprise a plurality of welding plates 18 embedded in the concrete of the panel 10 and extending to the corners 11, so that similar panels may be secured together by welds 13 connecting the plates 18 of the adjacent panels together to form a wall or the like. (See FIG. 5)

Figure 6:
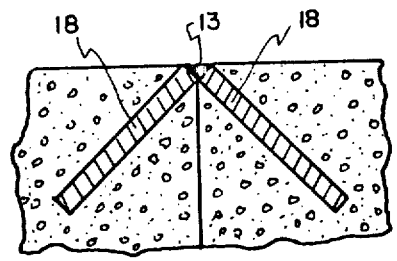
FIG. 6 is an enlarged representation of a corner of the panel of FIG. 1 shown attached to an adjacent similar panel.
Figure 4:
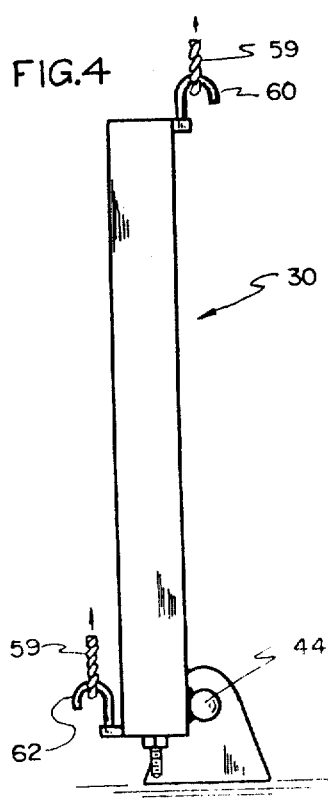
FIG. 4 is a side elevation view of the mold of FIG. 2, the mold being rotated to a vertical position.

The plates 18 may also be secured, by welds 15, to suitable foundation plates 26 carried by a suitable foundation 28, as seen in FIG. 6. The panel 10 may also have anchor bolts 25 cast into the body of the panel 10 and having extending threaded portions 27. The anchor bolts 25 may be used to connect the panel 10 to other structural components of a building of which the panel 10 may become a part. See FIG. 7, which, for example, illustrates the use of the anchor bolts 25 to secure a wooden mounting plate 29 to a top surface 31 of the precast panel 10. Ceiling joists or the like, not shown, may then in turn be secured to the mounting piece 29 during construction of the building.

Figure 8:
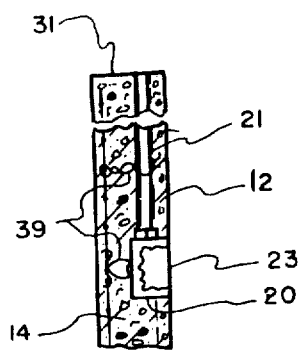
FIG. 8 is a partial cross-sectional representation of the panel of FIG. 1 taken along line 8—8 thereof.

The panel 10 may also carry electrical outlet boxes 20 with communicating electrical wiring conduits 21. As best seen in FIG. 8, the outlet boxes 20 may be cast into the panel 10 so as to present an open side 23 thereof flush with a surface 33 of the panel 10, so that access to the box 20 is provided for installation of electrical wiring, not shown. Each box 20 carries communicating conduits 21, which may be so disposed in a preplanned manner so that the conduits 21 will communicate with corresponding conduits in adjacent modular panels when the panels 10 are used to form the wall of a building, or with the top surface 31 of the panel 10. Thus, the electrical wiring of the building may be installed without subsequent installation and mounting of conduits in or on the walls thereof.

The panel 10 may also carry one or more layers of wire mesh 16 embedded in one or both of the layers 12 and 14, to impart additional compressive and tensile strength to the panel 10. The mesh 16 preferably comprises strands 17 electrically welded at their junctures 13. The mesh 16 preferably extends substantially the full extent of the panel 10.

The use of precast modular panels to form the walls of a building has a general potential economic advantage, since mass production methods may be employed in a facility for that purpose, so that the panels may be constructed and installed with a total savings in labor cost. However, the degree to which this potential economic advantage can be exploited is dependent upon several characteristics of the panels themselves. Thus, panels should desirably exhibit high resistance to the flow of heat, so that thin panels may be used without subsequent excessive costs in heating and cooling of the building in which the panels are used. Further, the panels should have high structural strength, so that highly insulative panels may be constructed thinly so as to exploit the high insulative properties without being so weak as to present a problem in handling during their installation, or from imposed building loads, and loads from wind, snow and the like.

Panels of both high insulating and high strength characteristics may be constructed of lighter weight so that they may be handled more easily and with less expensive lifting equipment and the like. As hereinafter fully described, the panel 10 is constructed of materials which impart improved insulating properties and improved structural strength so that the full economic advantage of a lightweight, highly insulative, and structurally strong modular building panel may in fact be exploited. That is, the present invention makes possible the construction of precast concrete modular panels exhibiting lower weight than do present precast panels, while maintaining stadards of strength and thermal conductivity. Or, stated conversely, the present invention enables the construction of panels of the same weight as present panels, while exhibiting improved structural strength and thermal conductivity.

COMPOSITION, STRENGTH AND WATER RESISTANCE

As previously indicated, the embodiment of the panel 10 illustrated in FIG. 1 comprises two layers 12 and 14 of lightweight concrete. The layer 14 may be selected to impart particularly high resistance to heat flow through the panel 10, with the layer 12 used to impart structural strength to the panel 10 for its handling and use as a building panel. Further, the layer 12 itself also has unusually good thermal insulating properties, so that the resultant total panel 10 is both unusually strong and unusually high in insulating properties.

The layer 14 concrete may comprise perlite aggregate 106, which concrete typically exhibits compressive strength in the range of only 300 to 1000 pounds per square inch (hereinafter p.s.i.), not sufficient for structural use in the panel 10. Perlite concretes are therefore typically used for insulating and not for structural purposes. Perlite is a volcanic glass generally broken by concentric cracks formed by cooling upon its formation, made up of small spheroidal masses. It may be expanded by application of heat before use as an aggregate in concrete or plaster.

The inventive perlite concrete comprises also fibrous material, such as chopped fiberglass 104, which material further assures the sound union of the layers 12 and 14 in the finished panel 10. Vermiculite, pumice (conventional or selected as in the layer 14) or other suitable insulative aggregates may also be used in the layer 12, as may a suitable mixture of such lightweight insulative aggregates.

Of particular significance to the present invention is the structurally strong lightweight concrete comprising the layer 12. The layer 12 may often be disposed outwardly in the building wall, so that it is subject to attacks by moisture during the life of the building. Accordingly it is desirable that this lightweight layer 12 be resistant to the absorption of water without compromise of its strength. It has been found that such a concrete can be constructed comprising scoria 100 as one aggregate therein to generally provide strength, along with selected pumice 102 as another aggregate, the pumice 102 generally serving to impart water resistance to the concrete.

Pumice is, in general, a highly vessicular, highly porous, volcanic glass formed by the extravasation of water vapor at high temperatures, being a glass froth typically composed of a mass of silk-like fibers which form many pores, so that pumice in general is so light as to float on fresh water. Under an electronic microscope, however, conventional pumice appears largely globular or nodular, the nodules largely forming the macroscopic fibers. However, the selected pumice for the inventive concrete is stronger and more dense, and appears under an electronic microscope to be substantially of fibrous or crystal-like structure, as is hereinafter more fully described.

Scoria of the volcanic type is a rough vesicular cinder-like lava developed by expansion of enclosed gases in volcanic magma. It is generally rather dark in color, and has considerable structural strength, although light in weight. The term "scoria" has acquired various different meanings in the building art, and is most commonly used to refer to the refuse of the reduction of ores. For purposes of this application, the term "scoria" is used throughout, in both the specification and the claims, to mean "volcanic scoria" as hereinabove described and defined.

Concretes comprising scoria aggregate generally exhibit strong tendencies to absorb water, rendering such concretes largely unsatisfactory for use in exposed structures. Scoria concretes, however, exhibit structural strengths typically in the range from about 1200 p.s.i. to about 3000 p.s.i, the latter being at least marginally sufficient for structural uses. (See FIG. 11).

Figure 11:
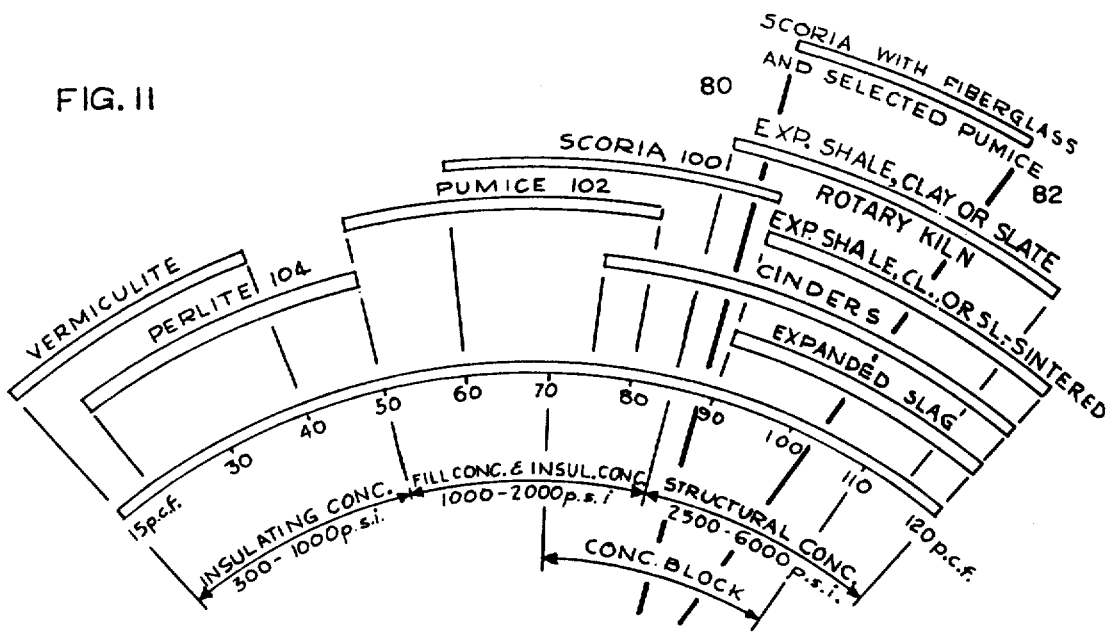
FIG. 11 is diagramatic representation of several properties of several types of concrete, including the concrete of the invention.

Addition of fibrous materials, such as chopped fiberglass 104, in relatively small amounts to scoria concretes has been found by the inventor to increase their strengths to as high as 4200 p.s.i., well into the range of strength of structural concretes. As hereinafter more fully described, such concretes may be readily produced with structural strengths of over 3000 p.s.i., entirely adequate for use in the panel 10, and in building panels in general. The strength of such concretes falls into the range bounded by lines 80 and 82 as seen in FIG. 11.

The aforementioned pumice aggregate improves the thermal conductivity of the layer 12 concrete, as well as imparting water resistance. However, the inventor has discovered that only pumice of a particular description will produce a sufficiently strong concrete in combination with scoria. While there is no confirmed explanatory theory, pumices from various geographical sources differ in ability to produce high strength scoria concretes. The inventor has discovered that pumices which impart the desired strength along with water resistance may be obtained at least from the vicinity of Lava Hot Springs, Idaho, from Milford, Utah, and from Malad, Idaho, whereas pumice from all other sources known to the inventor in the Western United States will not do so.

Figure 9:
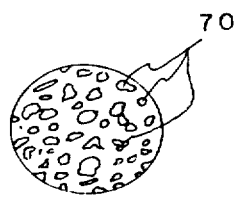
FIG. 9 is a representation of the appearance of conventional pumice as seen through an electronic microscope.
Figure 10:
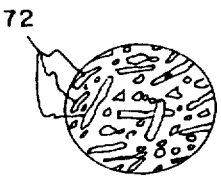
FIG. 10 is a representation of the appearance of the selected pumice of the inventive concrete as seen through an electronic microscope.

Further, the satisfactory pumice may be identified by examination of its micro-structure, using an electronic microscope. The observable differences in structure between the satisfactory and unsatisfactory pumice are illustrated in FIGS. 9 and 10. Referring to FIG. 9, it is seen that the structure of the unsatisfactory pumice appears under the microscope to substantially comprise nodules 70 of microscopic size. In contrast, the structure of the desirable pumice, as seen in FIG. 10, is characterized by the presence of a greater number of elongated structures 72, fiberlike or crystal-like in appearance, and of greater size than the nodules 70, which may be as small as 400-500 microns. It is speculated that the crystal-like nature is an important factor to the water resistance properties, because it may be accompanied by fewer, and less extensive, capillary-like pores providing passages for water. However, laboratory tests of absorption capabilities of pumice of the two types reveal no significant differences between them. These structures may also improve the strength of the pumice.

Laboratory investigations reveal no significant differences in the chemical compositions of the two types of pumice.

Both types are of volcanic glass, comprising high percentages of silica dioxide, and seem to have approximately the same minor percentages of other materials in approximately the same proportions, being several metallic oxides and a small amount of water. However, laboratory tests do show that the desirable pumice is of greater density and of greater compressive strength, being about 90 pounds per cubic foot and about 600 pounds per square inch respectively. In contrast, the unsatisfactory pumice has little structural strength to impart to the concrete. It is speculated that the satisfactory pumice was formed in past geological ages under conditions of greater temperature and pressure than was the unsatisfactory, weaker pumice, such conditions resulting in the differing structures as illustrated by FIGS. 9 and 10.

The special selected pumice described above and used in the inventive concrete, further, fully conforms to Federal Housing Administration Minimum Property Standards 704-2.1 for lightweight aggregates. Accordingly, the selected pumice may be used for structural concrete in dwellings built under Federal auspices. Such was the conclusion of the Technical Standards Architecture and Engineering Division of the Department of Housing and Urban Development of the Federal Housing Administration after examination of samples submitted in 1970. In fact, the inventive concrete was so used on an experimental basis in a dwelling constructed by the inventor in 1970, under the auspices of the Department of Housing and Urban Development. Tests conducted by an independent testing laboratory indicate that the selected pumice aggregate has a compressive strength in the neighborhood of 600 pounds per square inch and a density of 90 pounds per cubic foot. Conventional pumice, in contrast, has almost negligible compressive strength, a fact which has effectively limited its use to that of insulating fillers, plasters and the like.

The present state of the art in respect to economically achievable strengths of concretes is illustrated in FIG. 11, which shows comparative weights and strengths of concretes comprising several lightweight aggregates, as well as the strengths and weights of structural concretes. Structural concrete typically comprises gravel, sand or the like, being hard, dense aggregates. Note that the lightweight aggregate scoria 100 can produce lightweight concretes of about 80 or 90 pounds per cubic foot (p.c.f.), which exhibit structural strengths of as much as 3000 pounds per square inch (p.s.i.), which is at least marginally within the structural concrete range. However, the inventive concrete is not so limited in strength, being represented in FIG. 11 by the lines 80 and 82, which establish the boundaries of the properties achieved at the present time by the inventive concrete. Note that strengths of 3000 to 4200 p.s.i. have been achieved by the inventive concrete, which, as hereinbefore described, comprises scoria, selected pumice, and chopped fiberglass.

Note also from FIG. 11 that concrete comprising pumice 102 aggregate alone exhibits strengths of about 1000 to 1800 p.s.i. Accordingly, since scoria concretes exhibit strengths of about 1200 to 3000 p.s.i., it would be reasonable to expect that a lightweight concrete comprising both scoria and conventional pumice aggregates would exhibit strengths of substantially less than 3000 p.s.i., perhaps below the structural concrete range. However, the inventive concretes typically exhibit strengths well into the structural range, as hereinabove described, which fact may be attributed to the selected pumice and to the addition of the chopped fiberglass 104.

Note also from FIG. 11, that concretes comprising other lightweight aggregates, such as expanded slag, cinders, expanded shale, clay or slate especially treated in a rotary drying kiln, or sintered, may also exhibit high strengths. However, these concretes do not in general have the resistance to moisture absorption of the inventive concrete, nor do the cinder concretes. There is one exception, being concrete comprising expanded shale (going under the trade name of Utilite) or slate treated in a rotary kiln or sintered. However, such concretes are inherently expensive to produce, because of the necessary special treatment and special handling required for the aggregate in the mixing and curing process.

A typical formulation of the layer 12 concrete for use in panel 10 comprises:

By Weight

5½ bags of cement (94 lbs. each = 517 lbs.)
700 lbs. of ¼ in. aggregate (See below)
700 lbs. of fines (conventional pumice, ⅛ in.)
25 lbs. of ¼ in. chopped fiberglass.

By Volume

50% of ¼ in. aggregate (25% scoria, ¼ in. to ½ in. mesh)
50% fines (selected pumice, ⅛ in. mesh)
5 lbs. of ¼ in. chopped fiberglass per bag of cement
5½ bags of cement.

The aggregate used in the inventive concrete typically comprises 25-30% of ¼ inch selected pumice 102, and 25-30% of ¼ inch to ½ inch scoria 104. The fines comprise 40-50% of ⅛ inch conventional pumice fines.

To produce the layer 12 concrete, the above described aggregates and cement are thoroughly mixed together in a mixer and sufficient water added for hydration of the cement, and to produce sufficient workability to the wetted mixture. The workable mixture is then poured into a suitable panel mold 30, as hereinafter described.

The strength of the inventive concrete can presently best be achieved through a batch mixing process. Continuous mixing approaches present difficulties in producing the strengths hereinbefore indicated for the inventive layer 12 concrete. This is probably only because continuous mixers do not permit observation of the thoroughness of the mixing. It is expected that continued investigation will enable the high strength inventive concrete to be produced by the continuous mixing process, wherein the aggregates, cement, water and the like are continuously added in proper proportions into a continually operating mixing apparatus and continuously poured therefrom into the molds.

The inventive lightweight concrete for use in modular panel 10 typically achieves sufficient strength by curing for about five hours after being placed in the panel molds 30 (see FIG. 2), for their handling and transport to a final curing location as hereinafter described. The total curing time required for the inventive concrete is substantially the same as for the conventional structural concretes, being in the neighborhood of 30 hours under normal conditions. The curing times can be accelerated by the use of steam in the batch mixer, which is of course desirable to increase the capacity of a panel producing plant through reduced tie-up time for the panel forming molds. However, the use of steam is not an essential element of the process for producing the lightweight panels 10 of lightweight concrete. The detailed process by which the panels may be produced is described hereinafter.

INSULATIVE PROPERTIES

It is apparent from the information presented hereinabove that the inventive concrete is readily produced and possesses the requisite structural strength for use in the modular panel 10 and that the concrete is abundantly resistant to-moisture and water damage. Consider now the thermal insulating properties of the panel 10. The panel 10 may, for example, comprise a layer 12 of 6 inch thickness and a layer 14 of 2 inch thickness. The layer 14 concrete, comprising highly insulative aggregates, has a low thermal conductivity, especially for a concrete having structural strengths well into the structural range. In fact, presently available data, although limitted in amount, indicates that the layer 14 concrete has a thermal conductivity well below that of the available, weak insulating concretes such as those comprising perlite and the like. This present data indicates that the inventive layer layer 14 concrete has a thermal conductivity in the neighborhood of 0.1075 BTU/hr-Ft °F., whereas perlite concretes and the like typically exhibit thermal conductivities of around 0.300 BTU/hr-Ft °F. at comparable reference temperatures.

The aforesaid thermal conductivity of the layer 14 concrete would indicate that no layer 12 of conventional insulating concrete would be needed in the panel 10. However, since thermal conductivity data for the layer 14 concrete is at this time very limitted, it has been considered adviseable to use the layer 12 of confirmed high insulative performance. The panel 10 comprising the layers 12 and 14 has exhibited insulating properties heretofor achieved in concrete panels of comparable thicknesses only by the addition of substantially thick layers of insulating layers of cork, cellular plastic sheets, wood and the like, after such panels are cast and cured.

It is therefore apparent that the modular panel 10 is outstanding in insulating properties, while also providing the requisite structural strength and water resistance.

OTHER PANEL CHARACTERISTICS

The modular panel 10 inherently has several characteristics improving the economy of construction of buildings, because of certain general characteristics of pumice and perlite concretes retained by the inventive concrete. Nails may be driven directly into such concretes with an ordinary carpenter hammer and ordinary nails without drilling preparatory holes. Also, the perlite concrete can accept an interior decorative plaster, if desired, directly on its surface. Further, either of the perlite and the scoria-pumice concrete surfaces may be textured by the use of texturing layers in the molds 30 in which the panels 10 are formed. Thus, popcorn, simulated wood grain finishes and the like may be achieved during the manufacture of the panels 10 with negligible additional expense, saving the entire cost of final surface finishing of the panels after their erection.

METHOD OF MANUFACTURING

Figure 2:
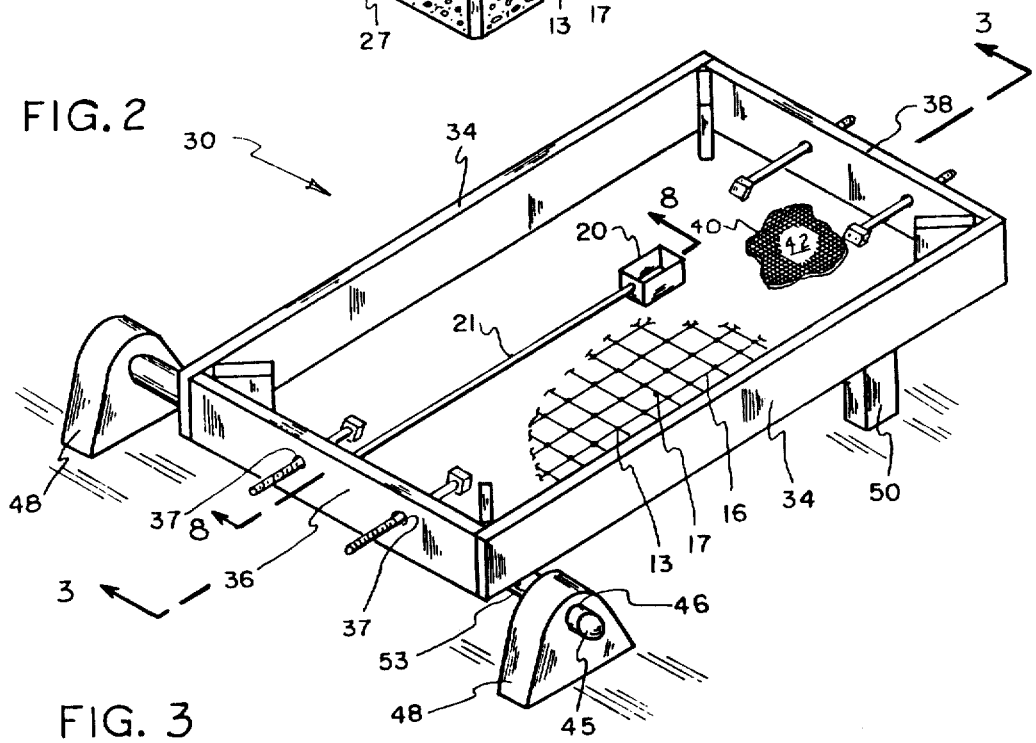
FIG. 2 is a perspective representation of a mold into which the inventive concrete and suitable insulating concrete are poured to form a precast concrete modular building panel in accordance with the principles of the invention.

A presently preferred method of manufacturing the modular panel 10 is now described with particular reference to FIGS. 1-4. FIG. 2 is a perspective representation of a horizontally disposed mold, generally designated 30, defining the four edges and one side of a rectangular panel 10. Panel mold 30 has a bottom plate 32, side plates 34, and end plates 36 and 38, all of said plates being removably secured together by suitable fasteners or the like, not shown. The bottom plate 32 may optionally be overlaid with a mat 40 having an upwardly disposed surface 42 textured to impart a pleasing surface appearance to the finished panel 10.

While only a single panel mold 30 is illustrated in the Figures, it should be understood that a plurality of such molds could be used, so that large batches of panel forming concrete, or a continuously supplied mixture from a continuous mixer, could be used in a single pour so as to produce a plurality of the panels 10.

Figure 3:
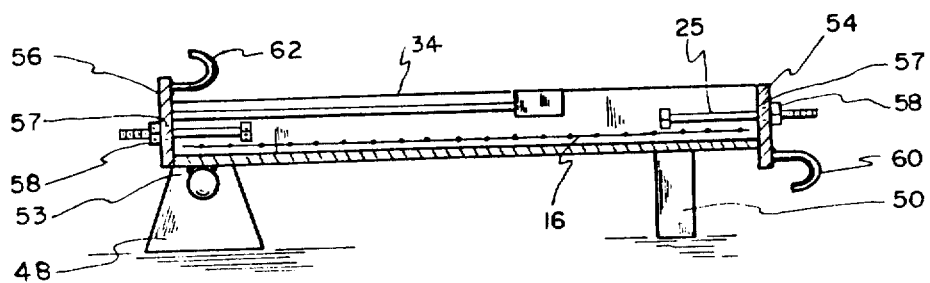
FIG. 3 is a cross-sectional representation of the mold of FIG. 2, taken along line 3—3 of FIG. 2.

The welding plates 18 may be disposed in the mold 30, as best seen in FIG. 2, as may be strengthening wire mesh 16. The anchor bolts 25 are disposed in bores 37 in the end plates 36 and 38, with threaded ends 27 extending to the exterior of the mold 30. Electrical receptacle boxes 20 and the associated electrical conduits 21 may be suitably supported in the mold 30, as shown in FIG. 3 and in more detail in FIG. 10. The mesh 16 may be utilized to support the boxes 30 using wire ties 39, so that the open end 23 thereof communicates with a surface 33 of the panel 10. The open boxes 20 may be filled with wadded paper or the like, not shown, to preclude the entry of concrete thereinto during pouring of the concrete comprising the panel 10 into the mold 30.

The mold 30 carries an axle 44 secured to the bottom plate 32 by welds 53, as best seen in FIG. 3. The axle 44 communicates pivotally with mold supports 48 through bores 46 therethrough. Fixed supports 50 are provided also, so that the mold 30 rests in the horizontal position as seen in FIGS. 2 and 3.

After the mold 30 is assembled, and the wire mesh 16, boxes 20, and the like are installed therein as seen in FIG. 2, a first quantity of concrete is poured to form the layer 12 in the bottom of the mold 30 to its designated thickness in the finished panel 10 and the mold 30 is vibrated by any suitable vibrator a sufficient time to cause the uncured concrete to completely fill the mold 30 and to efficiently entrain the previously described objects therein. The layer 12 comprises the scoria/pumice, fiberglass inventive concrete, the formulation and batch mixing of which is hereinbefore described.

After the layer 12 is thus formed in the mold 30, the layer 14, comprising the insulative concrete hereinbefore described, is immediately poured into the mold 30 onto the layer 12, while layer 12 is still uncured, and the mold 30 is vibrated a few seconds to form a thoroughly intermixed interface between the layers 12 and 14, so that the panel 10 will be entirely monolithic after its cure, said monolithic state being assured by the fibers carried by both layers 12 and 14. The upper surface 33 of layer 14 is then trowelled.

After the second layer 14 is poured and the mold 30 vibrated briefly, and the surface 33 trowelled, both layers 12 and 14 are allowed to cure together a suitable period of time, typically about five hours, for the concrete to achieve an initial partial amount of structural strength. After this period, the end plates 36 and 38 are removed from the mold 30, and are replaced by corresponding lifting plates 54 and 56, as seen in FIG. 3. The lifting plates 54 and 56 carry bores 57 therethrough accepting the anchor bolts 25, so that the plates 54 and 56 may be secured to the partially cured panel 10 by nuts 58 engaging the threads thereon. The lifting plates 54 and 56 carry also lifting hooks 60 and 62 respectively.

Cable 59, carried by any suitable crane or other lifting device, not shown, is then used to engage the hook 60 to pivot the mold 30 about the axle 44, carrying the panel 10 into a vertical position (see FIG. 4), and to lift it from the mold 30 onto a suitable carrier for transport to a suitable final curing station for completion of cure. The mold 30, now being relieved of the partially cured panel 10, may now be immediately cleaned as necessary, reassembled, and used for a next pouring of a next panel 10.

After completion of cure of the panel 10 in the above mentioned curing station, the panel 10 may be suitably stored for later use, or immediately transported to a building site for immediate installation as a portion of the wall of a building, as hereinbefore described.

The details of the design of the panel 10 may be varied as required for particular applications without departing from the spirit of the present invention, as may the process of manufacturing described herein. For example, some applications may not require the insulating layer 12, such as those wherein the panel may be used for interior walls, or for the floors of a building. In some applications, it may be desirable to use two insulating layers 14 disposed on the opposite sides of the structurally strong layer 12. Also, the panel 10 as described herein could as well be produced by pouring the insulating layer 14 prior to the structural layer 12, so that a decorative textured surface could be provided thereon by a textured mat disposed in the bottom of the mold 30. And, as previously indicated, the mold 30 could be shaped so that the panel 10 would carry openings and mounting hardware for windows, doors and the like.

The embodiments of the present invention described herein are intended to be illustrative only, and not restrictive. The scope of the present invention and the boundaries thereof are intended to be as defined by the appended claims, and all embodiments, processes, and methods contained therein are intended to be embraced thereby. The invention accordingly may be embodied in other specific forms without departing from the spirit or essential characteristics thereof. All changes which come within the meaning and range of equivalency of the appended claims are intended to be embraced therein.

What is claimed and desired to be protected by U.S. Letters Patent is:

1. A structure at least partially of a concrete formulation comprising:
   scoria, a suitable fibrous material, and pumice, the pumice being of a type having a microstructure substantial portions of which appear fiber-like under an electronic microscope, said type being found at least in the vicinity of Milford, Utah, Malad, Idaho, and Lava Hot Springs, Idaho, so that the scoria, the fibrous material and the pumice cooperate together in the concrete to render the concrete structurally strong and resistant to water.
2. The structure of claim 1, wherein:
   the fibrous material is chopped fiberglass.
3. A structure comprising:
   at least one portion of lightweight concrete comprising scoria, a suitable fibrous material, and pumice, the pumice being of a type having a microstructure substantial portions of which appear fiber-like under an electronic microscope, said type being found at least in the vicinity of Milford, Utah, Malad, Idaho, and Lava Hot Springs, Idaho, so that the scoria, the fibrous material and the pumice cooperate together in the concrete to render the structure strong and resistant to water, and
   at least one portion of lightweight concrete comprising aggregates selected from among perlite, vermiculite and perlite, and a suitable fibrous material, so that the insulating properties of the structure are enhanced and the portions are bonded permanently together upon cure after the portions are successively poured into a mold one upon the other.
4. The panel of claim 3, wherein:
   the fibrous material is chopped fiberglass.
5. The structure of claim 3, further comprising:
   wire mesh embedded in the concrete of the structure so as to impart additional structural strength thereto.

* * * * *